US 9,485,910 B2

(12) United States Patent
Lebeau et al.

(10) Patent No.: US 9,485,910 B2
(45) Date of Patent: Nov. 8, 2016

(54) BLADE ROTOR FOR A MOWER AND MOWER HAVING SUCH A BLADE ROTOR

(71) Applicant: DEERE & COMPANY, Moline, IL (US)

(72) Inventors: Jonathan Lebeau, Dijon (FR); Heinrich Tepe, Gray (FR); Lionel Guiet, Gray (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/623,776

(22) Filed: Feb. 17, 2015

(65) Prior Publication Data
US 2015/0237798 A1    Aug. 27, 2015

(30) Foreign Application Priority Data
Feb. 26, 2014    (DE) .......................... 10 2014 203 486

(51) Int. Cl.
*A01D 34/412*    (2006.01)
*A01D 34/66*    (2006.01)
*A01D 34/73*    (2006.01)

(52) U.S. Cl.
CPC .................................. *A01D 34/733* (2013.01)

(58) Field of Classification Search
CPC ............. A01D 34/661; A01D 34/664; A01D 34/733; A01D 34/63
USPC ................... 56/157, 193, 255, 295
See application file for complete search history.

(56) References Cited

U.S. PATENT DOCUMENTS

| 6,829,878 | B1 * | 12/2004 | Hoffman | A01D 34/733 56/295 |
| 8,857,038 | B2 * | 10/2014 | Fay, II | A01D 34/733 29/525.01 |
| 2013/0247530 | A1 * | 9/2013 | Heinrich | A01D 34/828 56/295 |
| 2014/0126952 | A1 * | 5/2014 | Fay, II | A01D 34/733 403/161 |

FOREIGN PATENT DOCUMENTS

| DE | 2612381 A1 | 10/1977 |
| EP | 0807374 | * 11/1997 |
| EP | 1008289 | * 12/1998 |
| EP | 1891851 | * 8/2006 |
| EP | 1891851 A1 | 2/2008 |
| EP | 2497353 A1 | 9/2012 |
| FR | 2630289 A1 | 10/1989 |

OTHER PUBLICATIONS

EP Search Report dated Jun. 24, 2015 (4 pages).

* cited by examiner

*Primary Examiner* — John G Weiss

(57) ABSTRACT

A blade rotor includes a mower disk, at least one mowing blade, at least one bearing pin mounted on the mower disk for pivotable mounting of the mowing blade, and a spring plate arranged on the mower disk for retaining the mowing blade on the bearing pin. In order to facilitate maintenance work when replacing the bearing pin, the invention proposes to provide a mounting hole in or on the mower disk, into which mounting hole the bearing pin can be screwed from a side of the mower disk facing away from the spring plate, wherein a threaded region and a retaining region are formed on the bearing pin, and the retaining region can be introduced through the mounting hole and brought into engagement with the spring plate when the bearing pin is screwed in.

18 Claims, 5 Drawing Sheets

BLADE ROTOR FOR A MOWER AND MOWER HAVING SUCH A BLADE ROTOR

CROSS-REFERENCE TO RELATED APPLICATIONS

Pursuant to 35 USC §119, this application claims the benefit of and priority to German patent application no. 102014203486.8, filed on Feb. 26, 2014, which is herein incorporated by reference in its entirety.

FIELD OF THE DISCLOSURE

The invention relates to a blade rotor for a mower having a mower disk, at least one mowing blade, at least one bearing pin mounted on the mower disk for pivotable mounting of the mowing blade, and a spring plate arranged on the mower disk for retaining the mowing blade on the bearing pin.

BACKGROUND

Mowers are known and are used in agriculture, among other fields, for cutting stalky crops or straw-like materials and for depositing the crop on the ground in a swath for picking up by a baler, for example. The mowers can be designed as disk mowers and have a plurality of rotors arranged side by side. The rotors have rotating oval-shaped mower disks, on the long ends of which mowing blades are pivotably arranged on bearing pins. The mowing blades are pivotably retained between the spring plate and the mower disk on a bearing shaft formed on the bearing pin, wherein the spring plate is resiliently engaged with one end of the bearing pin and locks it in order to secure the mowing blade on the bearing pin. The bearing pin is typically seated in a mounting hole formed on the mower disk and is guided through the mounting hole on a side facing the spring plate and secured with a nut on the side of the mower disk facing away from the spring plate. When the mowing blade becomes damaged or worn, the spring plate can be detached with a clamping tool from the end of the bearing pin, which creates a limited installation space that enables rapid removal of the mowing blade from the bearing shaft. If the bearing pin itself becomes damaged or worn, however, an elaborate and time-consuming disassembly of the mower disk is necessary, since the installation space provided when the spring plate is detached from the bearing pin is not sufficient to guide the bearing pin out of the mounting hole. This is only possible by completely removing the spring plate from the mower disk.

EP 1891851 A1 discloses a mower of the type described above, having a mower disk for a mowing blade, with a bearing pin for pivotable mounting of the mowing blade on the mower disk. The mowing blade is retained by a spring plate that can be locked by a locking bar, wherein the bearing pin is guided through a mounting hole in the mower disk from a side facing the spring plate and is bolted on a side facing away from the spring plate. In place of a tensioning tool, the spring plate can be unlocked in this case for maintenance purposes, so that installation space results that allows the mowing blade to be replaced. It is disadvantageous here as well that the arrangement of the spring plate prevents replacing the bearing pin in case it becomes worn, without elaborate disassembly steps for disassembling the mower disk or the spring plate.

SUMMARY

The problem addressed by the invention is that of specifying a blade rotor of the type mentioned above by which the above-mentioned problems are overcome.

The problem is solved according to the invention by the characteristics of claim 1. Additional configurations and refinements of the invention are found in the subordinate claims.

According to the invention, a blade rotor of the type mentioned above is designed such that a mounting hole, into which the bearing pin can be screwed from a side of the mower disk facing away from the spring plate, is provided in or on the mower disk, wherein a threaded region and a retaining region are formed on the bearing pin, and the retaining region can be introduced through the mounting hole and brought into engagement with the spring plate when the bearing pin is screwed in. The bearing pin is therefore accessible from a side of the mower disk that faces away from the spring plate and can be detached from its fastening to the mower disk without the necessity of disassembling the mower disk in order to remove the spring plate. In addition, this guarantees that there is a quick-change function when changing a mowing blade, since the spring plate here can also be detached from the end of the bearing pin by using a tensioning tool. This allows a fast exchange of the bearing pin with little installation work.

The retaining region can be a bearing shaft for the mowing blade and can comprise the bearing pin end that can be brought into engagement with the spring plate, an annular elevation being formed between the bearing shaft and the end of the bearing pin. The annular elevation is used for delimiting the bearing shaft on which the mowing blade is guided, and constitutes an annular protrusion on the bearing pin. The annular elevation is preferably integrally formed on the bearing pin. However, it could alternatively also be formed by a securing ring guided in an annular groove or could be a ring guided on the bearing pin that is tensioned against a shoulder delimiting the bearing shaft. As another alternative, the annular elevation could also be formed as a screwed-on nut or a screwed-on ring.

The bearing pin can comprise a bolt head, and a wear protector can be provided for the bolt head. The bolt head can be formed as a hex head or a hex socket head, a slotted head, a cross head or some other typical type. Between the bolt head and the threaded region, a region can be formed that is used as a receiving shaft for the wear protector, which is arranged to protect the bolt head. The wear protector can be arranged between the bolt head and the threaded region and can be clamped between the bolt head and the mower disk when the bearing pin is being screwed in. The wear protector is designed such that it surrounds the bolt head laterally and projects slightly therefrom and protects the head against any contact with foreign bodies and against abrasion, damage and other wear when the mower disk is being rotated.

The mowing blade comprises a bearing hole, which can be dimensioned such that it can be guided over the bearing pin and the annular elevation onto the bearing shaft. Only when the mower disk rotates is the mowing blade in its bearing shaft pressed outward due to the centrifugal forces acting on the mowing blade.

The spring plate can comprise a retaining bore, in which the bearing pin end can be received, i.e. into which the bearing pin end can protrude, wherein the spring plate comes into contact with the annular elevation at a peripheral region of the retaining bore. The spring plate is pressed due to its resilient properties against the annular elevation and thus blocks the access to the mowing blade, so the mowing blade is axially fixed or secured on the bearing pin.

Facing the mower disk, a retaining protuberance, which partially surrounds the annular elevation and holds the mowing blade on the bearing shaft, can be provided on the spring plate. This has the effect that the mowing blade is reliably held on the axial height of the bearing shaft and can be guided radially into the bearing shaft more easily and with less wear when rotation of the mower disk begins.

The above-presented embodiment of a mowing rotor is particularly suitable for use on mowers, which can be designed with mowing blade rotors in the form of mower disks, mower plates or mower drums, and with or without processing units.

The invention and further advantages and advantageous refinements and configurations of the invention will be described in detail below with reference to the drawing, which shows an embodiment of the invention.

BRIEF DESCRIPTION OF THE DRAWINGS

Therein.

DETAILED DESCRIPTION

Figure 1:
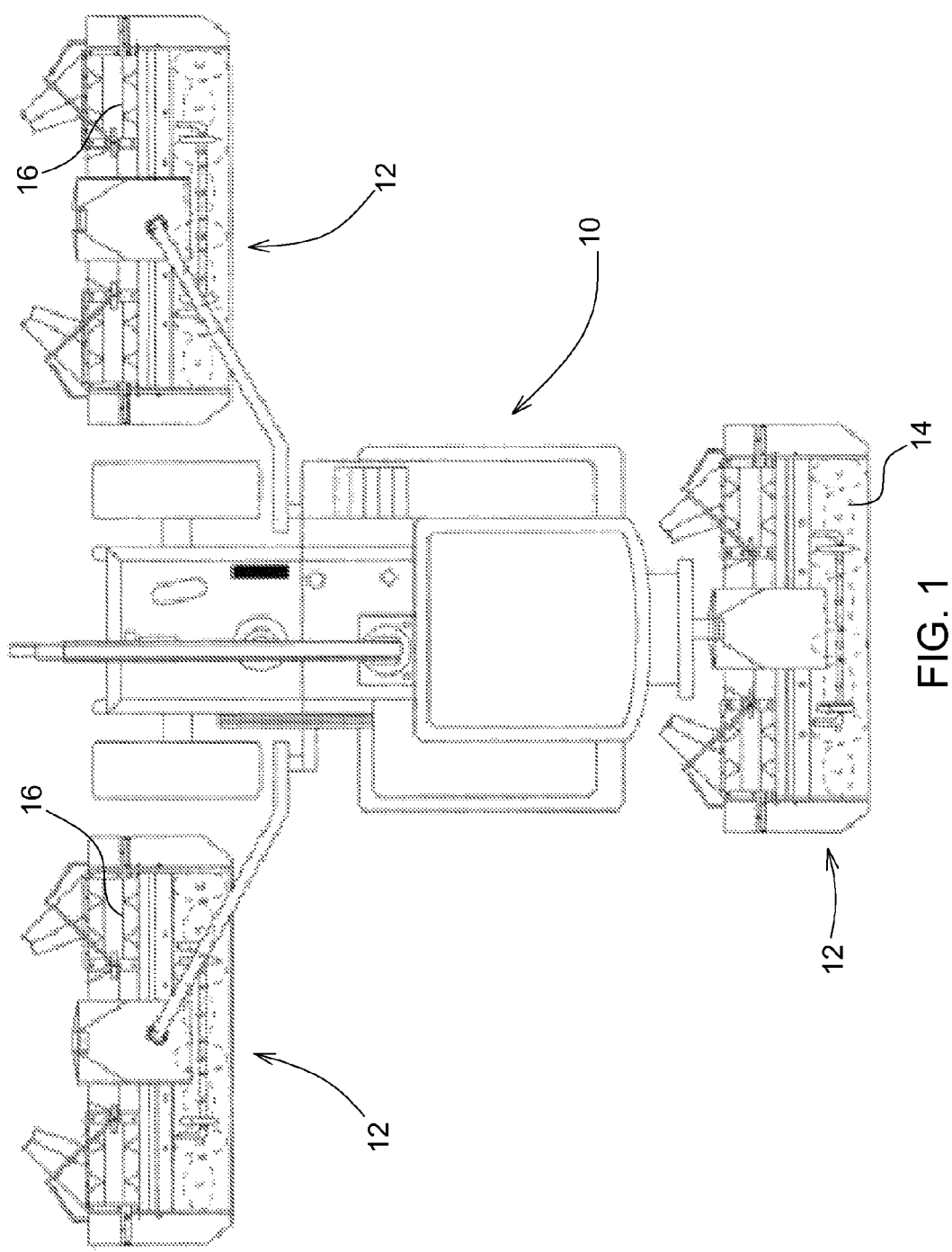
FIG. 1 shows a schematic plan view of an agricultural vehicle having a mower.

The agricultural vehicle 10 shown in FIG. 1 is a self-propelled mowing machine with mowers 12 in the form of a front mower unit 14 and lateral rear mower units 16. However, the vehicle 10, configured as a self-propelled vehicle here, serves only as an example, however, and could also be an agricultural tractor and be equipped with mowers 12 appropriately constructed as attached or towed implements.

Figure 2:
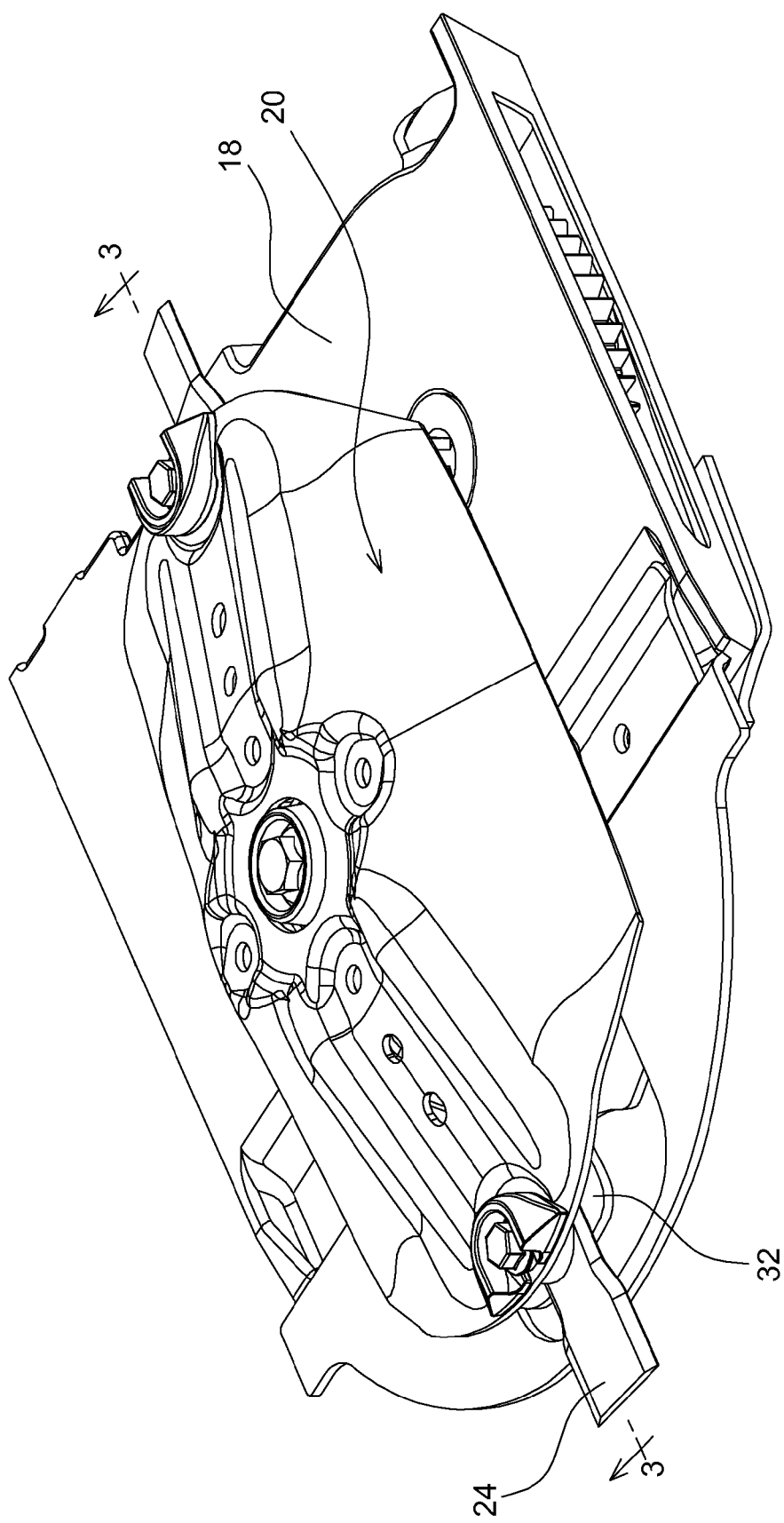
FIG. 2 shows a perspective upper side view of a mower beam having a blade rotor, on the mower from FIG. 1.
Figure 3:
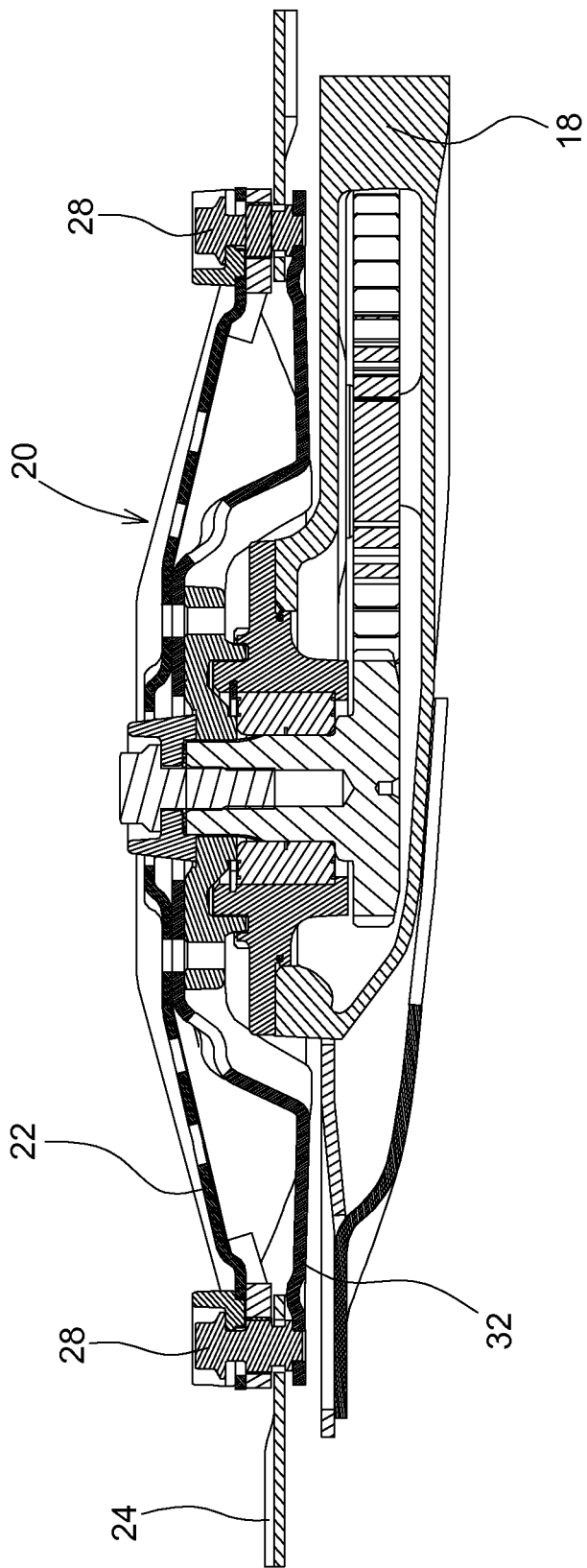
FIG. 3 shows a side cross-sectional view of the mower beam having the blade rotor from FIG. 2.

As shown in detail in FIGS. 2 and 3, a mower 12 comprises a mower beam 18 with a plurality of rotary driven blade rotors 20 arranged thereon (only one shown here).

Figure 4:
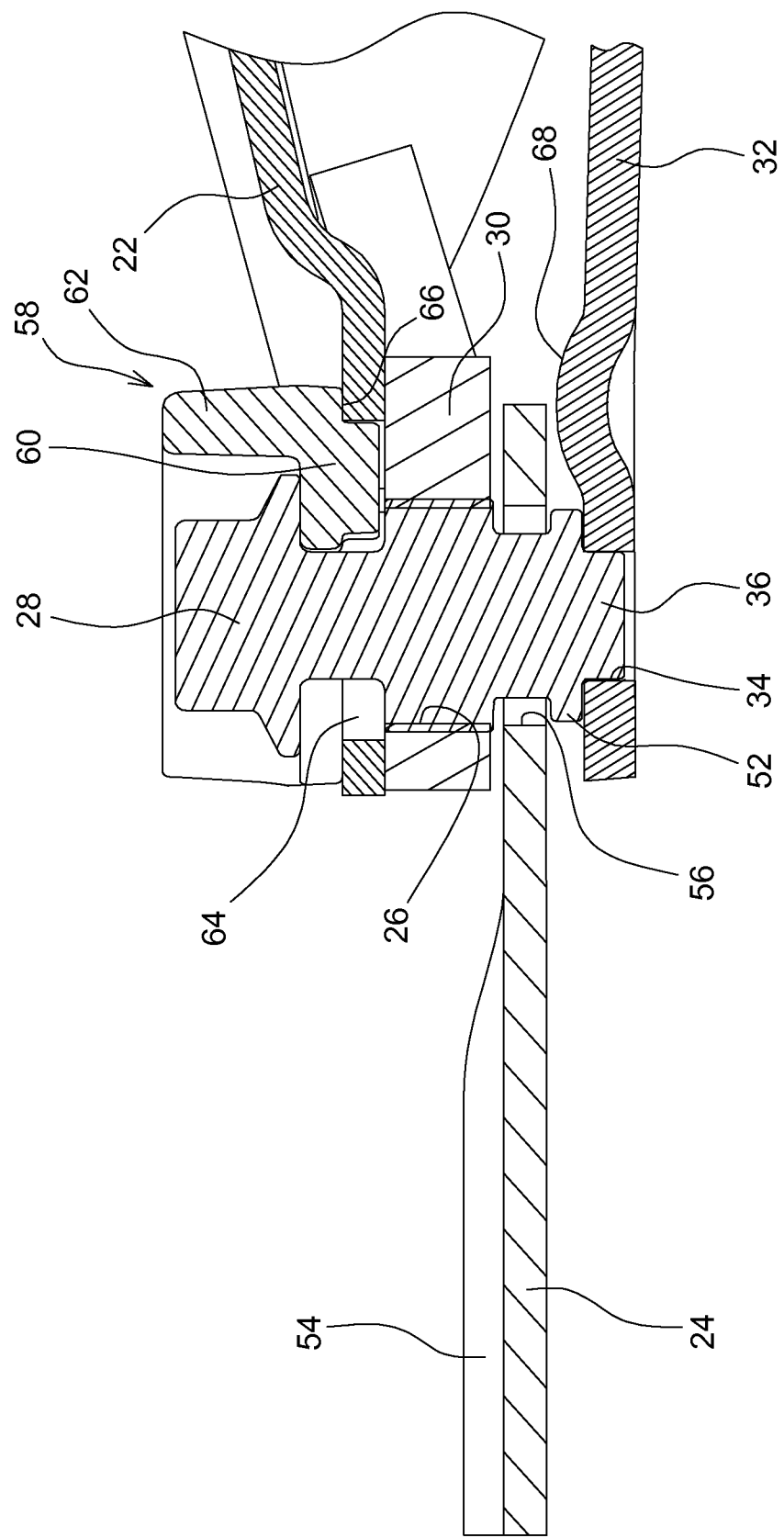
FIG. 4 shows a side cross-sectional view of a mower disk having a bearing pin of the blade rotor from FIG. 2.
Figure 5:
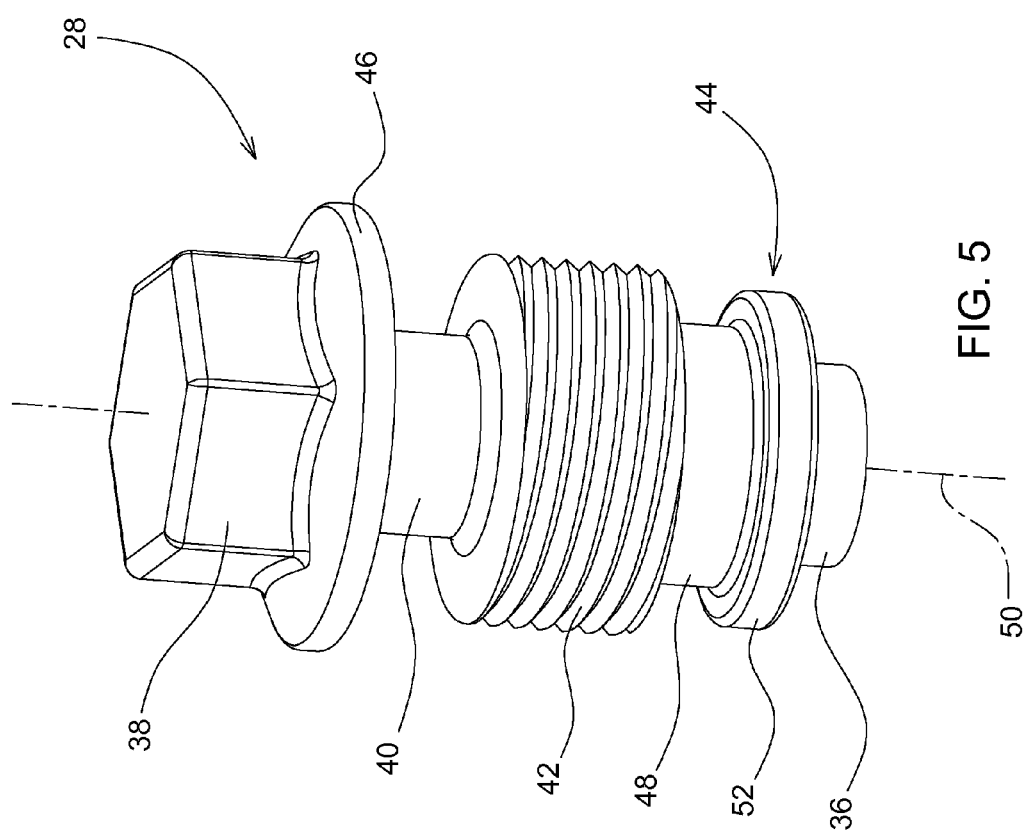
FIG. 5 shows a perspective side view of the bearing pin from FIG. 4.

The blade rotor 20 comprises a mower disk 22 with mowing blades 24 pivotably mounted thereon (only one shown here). The mower disk 22 in this embodiment has an oval shape, the mowing blades 24 being arranged at the long ends of the oval. The blade rotor 20, designed in this example as a mower disk 22, could also be designed in the familiar manner as a drum or a plate (blade drum, blade plate). It should be pointed out that the upward-facing side of the mower disk 22 in FIGS. 2-4 is the side of the mower 12 facing away from the ground to be cultivated. It is also a side of the mower disk accessible to the operator for maintenance purposes. In the further course of the description, this side will be referred to as the upper side of the mower disk 22 and the corresponding oppositely arranged side of the mower disk 22 as the underside.

The mowing blades 24 are pivotably suspended or mounted on the mower disks 22 by means of a mounting hole 26 formed on the mower disk 22 and provided with a thread, and bearing pins 28 screwed into the mounting holes. The mounting hole 26 is formed on a reinforcement 30 fastened to the mower disk 22 by welding. The reinforcement 30 is shown here as a plate or disk, but it can also be formed in some other manner, for example by a larger material thickness of the mower disk 22 in this region.

In order to retain and quickly install a mowing blade 24, a spring plate 32, originating from the center of the mower disk 22 and extending to the ends of the mower disk 22, is arranged on the underside of the mower disk 22. A retaining bore 34 is formed at each of the end regions of the spring plate 32 and is engaged with the bearing pin 28 in such a manner that one end 36 of the bearing pin 28 is received or clamped in the retaining bore 34.

The bearing pin 28 comprises a bolt head 38, a receiving shaft 40 adjoining the head, an adjoining threaded region 42 and an adjoining retaining region 44 for the mowing blade 24. The bolt head 38 has an annular rim 46 that is larger than the diameter of the threaded region 42. The receiving shaft 40 formed between the bolt head 38 and the threaded region 42 has a smaller diameter that is dimensioned smaller so that the threaded region 42 and the rim 46 of the screw head 38 each form a shoulder, by which the receiving shaft 40 is delimited. The retaining region 44 for the mowing blade 22 is formed between the threaded region 42 of the bearing pin and the end 36 of the bearing pin 28 opposite the bolt head 38. The retaining region 44 comprises a bearing shaft 48 and an annular elevation 52 extending radially to the longitudinal axis 50 of the bearing pin 28, in the form of a ring or rim extending around the circumference of the bearing pin 28 between the bearing shaft 48 and the end 36 of the bearing pin 28, wherein the diameter of the annular elevation 52 is dimensioned smaller than the diameter of the threaded region 42 on the bearing pin 28, but larger than the diameter on the bearing shaft 48. The diameter at the end 36 of the bearing pin 28 is dimensioned to form a shoulder in addition to the annular elevation 52, and the end 36 can be introduced into the retaining bore 34. The diameter of the retaining bore 34 on the spring plate 32 is dimensioned such that the spring plate can come into contact at the edge of the retaining bore 34 with the shoulder of the annular elevation 52.

The mowing blade 24 comprises, at an end thereof opposite the mowing blade edge 54, a bearing bore 56, the diameter of which is dimensioned such that it can be introduced over the bearing pin end 36 and over the annular elevation 52 onto the bearing shaft 40.

As can be seen in FIGS. 2 and 4, a wear protector 58 is provided for protecting the bolt head 38. The wear protector 58 is formed by a U-shaped collar having a mounting edge 60 and a collar shaft 62 that protrudes past the bolt head 38 and largely surrounds it. The U-shaped collar 58 is opened on one side, so that the mounting edge 60 can be guided or fitted between the rim 46 of the bolt head and the threaded region 42 on the receiving shaft 40. On the upper side of the mower disk 22, in the region of the mounting bore 26, a recess 64 surrounding the mounting bore 26 is provided, at the edge of which recess a shoulder 66 formed on the underside of the wear protector 58 rests and is clamped between the periphery of the recess 64 and the rim 46 of the bolt head.

A retaining protuberance 68 surrounding the mounting bore 34 and extending in the direction of the mowing blade 24 or the mower disk 22 is additionally formed on the spring plate 32. The retaining protuberance 68 is shaped such that a region on the underside of the mowing blade 24 surrounding the bearing bore 56 can contact the retaining protuberance 68, so that the mowing blade 24 is held at the level of the bearing shaft 48.

On light of the above, the bearing pin 28 for pivotable mounting of the mowing blade 24 is installed on the mower disk 22 as follows. The opened side of the wear protector 58 is guided onto the receiving shaft 40 of the bearing pin. The retaining region 44 of the bearing pin 28 is guided through the mounting bore 26 from the upper side of the mower disk 22, and the threaded region 42 is screwed into the mounting bore 26 until the shoulder 66 formed on the wear protector 58 comes into contact with the edge of the recess 64 in the mower disk 22. Before the end 36 of the bearing pin 28 is moved into the retaining bore 34 of the spring plate 32, the mowing blade 24 is guided past the annular elevation 52 onto the retaining region 44. When the bearing pin 28 has been completely screwed in, it projects into the retaining bore 34 of the spring plate 32, whereby the end 36 of the bearing pin 28 is locked and the mowing blade is enclosed between the spring plate 32 and the threaded region 42. The bearing pin 28 is now mounted on the mower disk 22 such that the retaining region 44 extends from the mounting bore 26 to the underside of the mower disk 22 and the end 36 of the bearing pin penetrates into the mounting bore 34 of the spring plate 32, and the spring plate 32 rests against the annular elevation 52. The mowing blade 24 is held at the level of the bearing shaft 48 by the retaining protuberance 68 on the spring plate 32. When the blade rotor 20 is in operation, the mowing blade 24 can move without hindrance into the complete bearing seat due to the resulting centrifugal forces and can pivot about the bearing shaft 48. A pivotable mounting of the mowing blade 24 on the bearing shaft 48 has the effect that the mowing blade 24 can perform a certain evasion movement if it encounters a resistance such as a stone.

Even though the invention was described only with reference to one embodiment, various alternatives, modifications and variants that fall under the present invention will be evident to a person skilled in the art in light of the foregoing description.

The invention claimed is:

1. A blade rotor for a mower, comprising:
a mower disk;
at least one mowing blade;
at least one bearing pin mounted on the mower disk for pivotable mounting of the mowing blade; and
a spring plate arranged on the mower disk for retaining the mowing blade on the bearing pin, wherein a threaded mounting hole is provided in the mower disk, into which the bearing pin can be screwed from a side of the mower disk facing away from the spring plate, wherein a threaded region and a retaining region are formed on the bearing pin, and the retaining region having a smaller diameter than the threaded region so that the retaining region can pass through the threaded mounting hole and brought into engagement with the spring plate when the bearing pin is screwed in.

2. The blade rotor of claim 1, wherein the retaining region comprises a bearing shaft for the mowing blade and a bearing pin end that can be bought into engagement with the spring plate, wherein an annular elevation is formed between the bearing shaft and the bearing pin end, the bearing shaft and the bearing pin end having smaller diameters than the annular elevation.

3. The blade rotor of claim 1, wherein the bearing pin comprises a bolt head, and a wear protector is provided for the bolt head, wherein a receiving shaft for the wear protector is formed between the bolt head and the threaded region, the receiving shaft having a smaller diameter than the threaded region.

4. The blade rotor of claim 2, wherein the bearing pin comprises a bolt head, and a wear protector is provided for the bolt head, wherein a receiving shaft for the wear protector is formed between the bolt head and the threaded region, the receiving shaft having a smaller diameter than the threaded region.

5. The blade rotor of claim 2, wherein the mowing blade comprises a bearing bore, wherein the mowing blade can be guided via the bearing bore over the bearing pin end and over the annular elevation onto the bearing shaft.

6. The blade rotor of claim 3, wherein the mowing blade comprises a bearing bore, wherein the mowing blade can be guided via the bearing bore over the bearing pin end and over the annular elevation onto the bearing shaft.

7. The blade rotor of claim 2, wherein the spring plate comprises a retaining bore in which the bearing pin end can be received, and the spring plate comes to rest against the annular elevation at a peripheral region of the retaining bore.

8. The blade rotor of claim 3, wherein the spring plate comprises a retaining bore in which the bearing pin end can be received, and the spring plate comes to rest against the annular elevation at a peripheral region of the retaining bore.

9. The blade rotor of claim 5, wherein the spring plate comprises a retaining bore in which the bearing pin end can be received, and the spring plate comes to rest against the annular elevation at a peripheral region of the retaining bore.

10. The blade rotor of claim 5, wherein a retaining protuberance, which partially surrounds the annular elevation and holds the mowing blade on the bearing shaft, is provided on the spring plate and faces the mower disk.

11. The blade rotor of claim 7, wherein a retaining protuberance, which partially surrounds the annular elevation and holds the mowing blade on the bearing shaft, is provided on the spring plate and faces the mower disk.

12. A mower having one or more blade rotors, the one or more blade rotors comprising:
a mower disk;
at least one mowing blade;
at least one bearing pin mounted on the mower disk for pivotable mounting of the mowing blade; and
a spring plate arranged on the mower disk for retaining the mowing blade on the bearing pin, wherein a threaded mounting hole is provided in the mower disk, into which the bearing pin can be screwed from a side of the mower disk facing away from the spring plate, wherein a threaded region and a retaining region are formed on the bearing pin, and the retaining region having a smaller diameter than the threaded region so that the retaining region can pass through the threaded mounting hole and brought into engagement with the spring plate when the bearing pin is screwed in.

13. The blade rotor of claim 12, wherein the retaining region comprises a bearing shaft for the mowing blade and a bearing pin end that can be bought into engagement with the spring plate, wherein an annular elevation is formed between the bearing shaft and the bearing pin end, the bearing shaft and the bearing pin end having smaller diameters than the annular elevation.

14. The blade rotor of claim 12, wherein the bearing pin comprises a bolt head, and a wear protector is provided for the bolt head, wherein a receiving shaft for the wear protector is formed between the bolt head and the threaded region, the receiving shaft having a smaller diameter than the threaded region.

15. The blade rotor of claim 13, wherein the bearing pin comprises a bolt head, and a wear protector is provided for the bolt head, wherein a receiving shaft for the wear protector is formed between the bolt head and the threaded region, the receiving shaft having a smaller diameter than the threaded region.

16. The blade rotor of claim 13, wherein the mowing blade comprises a bearing bore, wherein the mowing blade can be guided via the bearing bore over the bearing pin end and over the annular elevation onto the bearing shaft.

17. The blade rotor of claim 13, wherein the spring plate comprises a retaining bore in which the bearing pin end can be received, and the spring plate comes to rest against the annular elevation at a peripheral region of the retaining bore.

18. The blade rotor of claim 13, wherein a retaining protuberance, which partially surrounds the annular elevation and holds the mowing blade on the bearing shaft, is provided on the spring plate and faces the mower disk.

* * * * *